(12) United States Patent
Mashak

(10) Patent No.: US 11,313,470 B2
(45) Date of Patent: Apr. 26, 2022

(54) CONTAMINATION GUARD

(71) Applicant: Caterpillar Inc., Peoria, IL (US)

(72) Inventor: John M. Mashak, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 157 days.

(21) Appl. No.: 16/733,101

(22) Filed: Jan. 2, 2020

(65) Prior Publication Data
US 2021/0207712 A1 Jul. 8, 2021

(51) Int. Cl.
F16J 15/3248 (2016.01)
F16J 15/16 (2006.01)
F16J 15/3244 (2016.01)
F16J 15/3264 (2016.01)

(52) U.S. Cl.
CPC ......... F16J 15/3248 (2013.01); F16J 15/164 (2013.01); F16J 15/3244 (2013.01); F16J 15/3264 (2013.01)

(58) Field of Classification Search
CPC ...... F16J 15/162; F16J 15/324; F16J 15/3244; F16J 15/3252; F16J 15/3256; F16J 15/3264; F16J 15/3284
See application file for complete search history.

(56) References Cited

U.S. PATENT DOCUMENTS

| 3,475,033 A | 10/1969 | Voitik |
| 4,667,968 A | 5/1987 | Nash et al. |
| 10,240,678 B2 * | 3/2019 | Toth ..................... F16J 15/3284 |
| 10,738,891 B2 * | 8/2020 | Breusa ................. F16J 15/3256 |
| 2007/0172367 A1 | 7/2007 | Janocko |
| 2008/0128997 A1 * | 6/2008 | Berdichevsky ........ F16J 15/164 277/366 |
| 2016/0325214 A1 | 11/2016 | Davis |
| 2018/0128376 A1 | 5/2018 | Breusa et al. |

FOREIGN PATENT DOCUMENTS

| DE | 736187 | 6/1943 |
| FR | 2605362 | 4/1988 |
| GB | 2159894 B | 6/1987 |
| KR | 101956636 B1 | 3/2019 |

* cited by examiner

Primary Examiner — Nicholas L Foster
(74) Attorney, Agent, or Firm — Procopio, Cory, Hargreaves & Savitch LLP

(57) ABSTRACT

A contamination guard for a machine is disclosed herein. The contamination guard includes an inner ring, a first annulus, a second annulus, and an impeller. The impeller is configured to promote intake of nearby air with contamination. The first annulus and second annulus form a passage that is configured to sling away air with contamination during operation of the machine.

17 Claims, 4 Drawing Sheets

CONTAMINATION GUARD

TECHNICAL FIELD

The present disclosure generally pertains to machines, and is directed towards a contamination guard for a rotatable shaft of a machine.

BACKGROUND

Transmissions, engines, pumps, and other machinery of the like contain rotating parts that require a lubrication section to maintain performance. Guards and seals are used on these rotating parts to inhibit debris and contaminants from making an intrusion into the lubrication section. An intrusion of debris or contaminants into the lubrication section could increase wear and cause premature system failure.

U. S. Patent Publication No. 2016/0325214A to Davis, describes a contaminate separator for a seal of a rotatable shaft. The contaminate separator may have an annular casing defining an internal cavity and being configured to rotate with the rotatable shaft. The annular casing may have an inlet port configured to direct air into the internal cavity. The annular casing may also have a first outlet passage configured to discharge a first air flow from the internal cavity to atmosphere. The annular casing may further have a second outlet passage configured to direct a second air flow from the internal cavity to the seal. The annular casing may be configured to separate particulates from the second air flow.

The present disclosure is directed toward improvements in the art.

SUMMARY

A contamination guard for a rotatable shaft of a machine is disclosed herein. In embodiments, the contamination guard includes an inner ring, a first annulus, a second annulus and a plurality of impellers. The first annulus extends outward from the inner ring. The first annulus has a first annulus forward face, and a first annulus aft face opposite the first annulus forward face. The second annulus is spaced from and proximate to the first annulus forward face and spaced outward from the inner ring. The first annulus and the second annulus form a passage there between. The second annulus has a second annulus forward face, and a second annulus aft face opposite the first annulus forward face. The plurality of impellers are spaced apart from each other and each has a body extending outward from adjacent the inner ring to the second annulus and beyond the second annulus forward face, and an impeller rib extending from adjacent the inner ring to between the second annulus aft face and the first annulus forward face away from the inner ring.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. In some instances, well-known structures and components are shown in simplified form for brevity of description.

Figure 1:
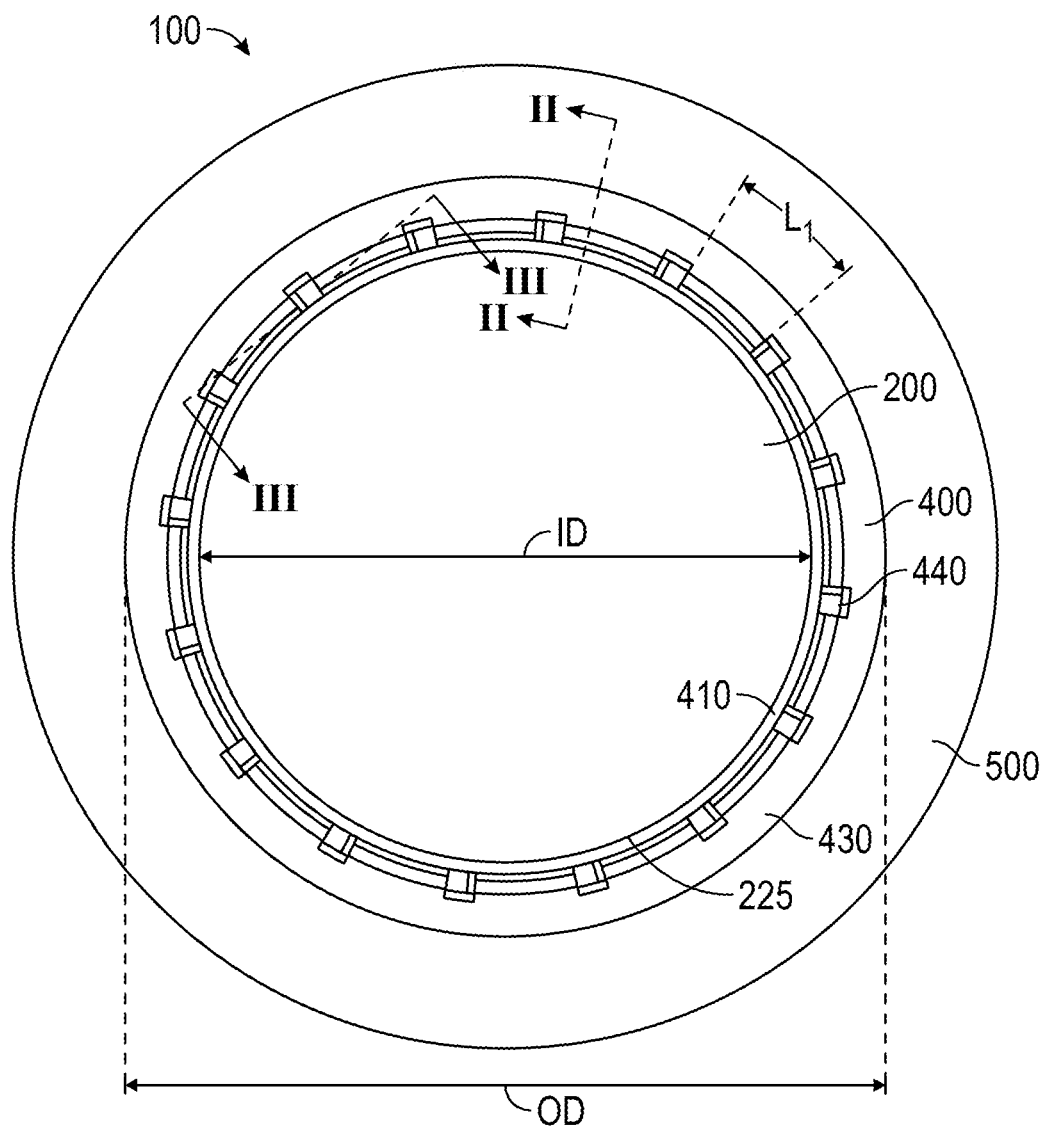
FIG. 1 is an illustration of a contamination guard installed around a shaft.

FIG. 1 is an illustration of a contamination guard installed around a shaft. The disclosure may reference a forward direction and an aft direction. Generally, references to the aft direction are towards the power receiving end (not shown) of a shaft 200 (e.g., towards the engine) of a rotating shaft assembly 100 and references to the forward direction are away from the power receiving end of the shaft 200. Similarly, use of the term outward refers to radially away from, for example radially away from the shaft 200.

The rotating shaft assembly 100 can include the shaft 200 (sometimes referred to as the rotating shaft) and a contamination guard 400. The rotating shaft assembly 100 can be positioned within a stationary housing 500. The shaft 200 can have a cylindrical shape and may be rotatable. The shaft 200 may receive power from within the housing 500, causing the shaft 200 to rotate. The shaft 200 can include a shaft outer surface 225. In an embodiment the housing 500 can encircle the shaft 200 and be outward from the contamination guard 400.

The contamination guard 400 can encircle the shaft 200. In an embodiment the contamination guard 400 is in contact with the shaft outer surface 225. The contamination guard 400 can include an inner ring 410, a second annulus 430, and an impeller 440 or plurality of impellers 440 spaced apart from each other. The inner ring 410 can encircle and be adjacent to the shaft outer surface 225. The impellers 440 can extend outward (radially away from the inner ring 410) from adjacent the inner ring 410. Impellers 440 can be evenly spaced apart around the inner ring 410. Length L1 can be the circumferential distance between each impeller 440. The length L1 can range depending on the number of impellers 440 and other dimensions of the contamination guard 400.

In an embodiment there are sixteen impellers 440 that extend outward from the inner ring 410. In another example there is a single impeller. In other examples there are two, three, four, five, six, seven, eight, nine, ten, eleven, twelve, thirteen, fourteen, fifteen, seventeen, eighteen, nineteen, twenty, twenty one, twenty two, twenty three, twenty four, twenty five, twenty six, twenty seven, twenty eight, twenty nine, thirty, or more impellers 440.

Where the drawing includes multiple instances of the same feature, for example impeller 440, the reference number is only shown in connection with one instance of the feature to improve the clarity and readability of the drawing. This is also true in other drawings which include multiple instances of the same feature.

The second annulus 430 can extend outward (away from inner ring 410) from a portion of the impeller 440. The second annulus 430 can circumferentially extend around the inner ring 410.

The contamination guard 400 can have an inner diameter (ID) and an outer diameter (OD). In an embodiment the ID is the inner diameter of the inner ring 410. In an embodiment the OD is the outer diameter of the second annulus 430.

Figure 2:
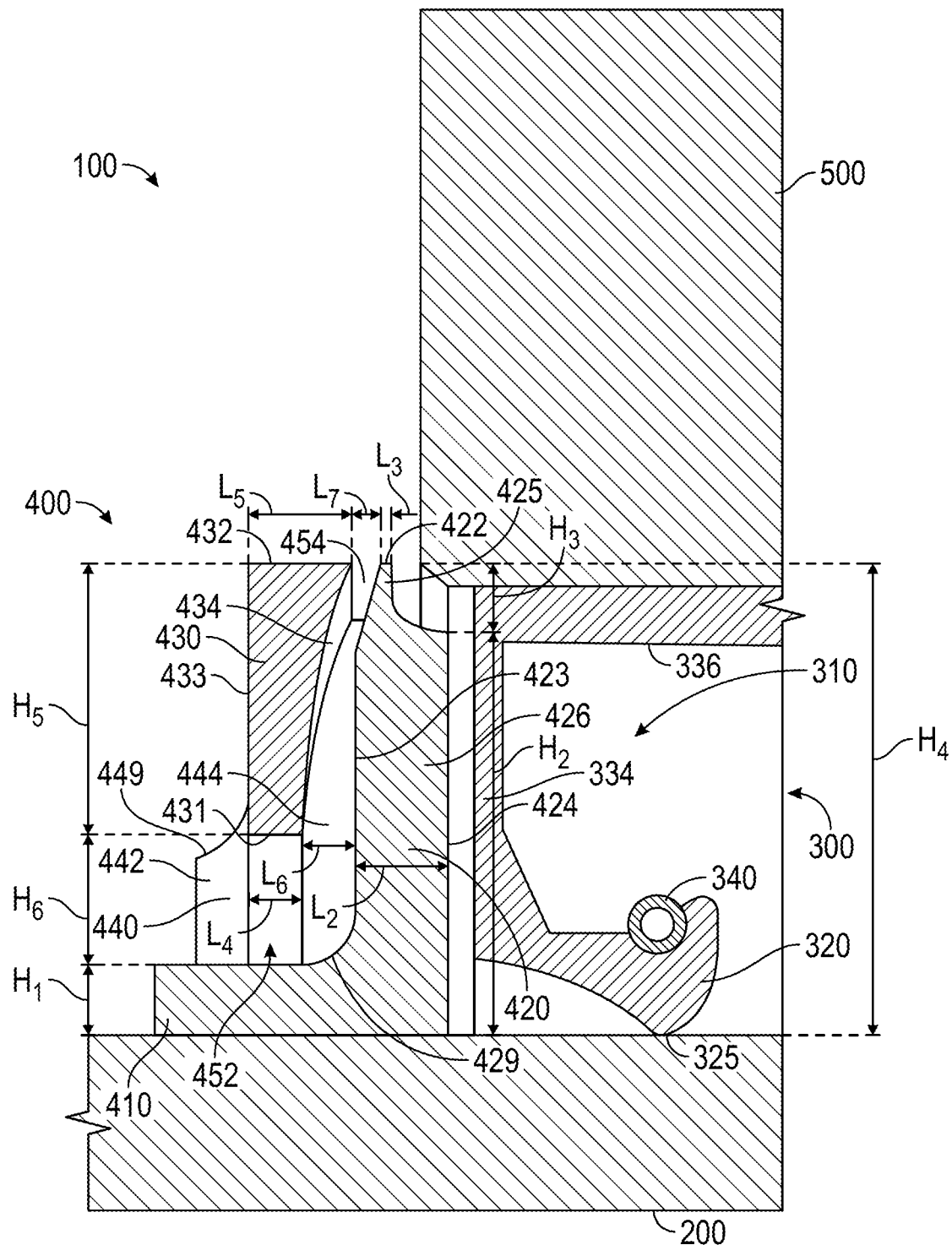
FIG. 2 is a cross-section of a portion of the contamination guard installed around a shaft from FIG. 1 along plane II-II.

FIG. 2 is a cross-section of a portion of the contamination guard installed around a shaft from FIG. 1 along plane II-II. The rotating shaft assembly 100 further includes an oil sealing assembly 300. In an embodiment the oil sealing assembly 300 may further include an oil cavity 310, an oil sealing element 320 having a shaft sealing edge 325, a radial lip seal body 334, a radial lip seal arm 336, and an oil sealing element ring 340. The oil sealing element 320 can encircle the shaft 200. The oil sealing element 320 can be disposed radially outward from the shaft 200. The oil sealing element 320 may include a shaft sealing edge 325 disposed proximal to the shaft outer surface 225. The shaft sealing edge 325 may contact the shaft outer surface 225, and be operable to provide a seal that prevents oil from leaking out of the oil sealing assembly 300. The oil sealing element ring 340 may provide a force directed radially inward on the oil sealing element 320 to help provide adequate contact between the shaft sealing edge 325 and the shaft outer surface 225. The oil sealing element ring 340 may be a garter spring. The radial lip seal body 334 may adjoin and extend radially outward from the oil sealing element 320. The radial lip seal arm 336 may extend axially from the radial lip seal body 334 towards the aft direction.

The oil cavity 310 may be defined by the space created between the shaft outer surface 225, the oil sealing element 320, the radial lip seal body 334, and the radial lip seal arm 336.

The contamination guard 400 can encircle the shaft outer surface 225. The contamination guard 400 can be disposed more forward of the oil sealing assembly 300. The contamination guard 400 can be made of a single parent material. The contamination guard 400 may be made of metal, or plastic such as fluoroelastomers, nitrile rubber elastomers, synthetic resin material, or elastomeric material. The contamination guard 400 can be made to be resilient against wear and corrosion.

The contamination guard 400 can further include a first annulus 420. The first annulus 420 can extend outward from adjacent the inner ring 410. In an embodiment the first annulus 420 can extend circumferentially around the inner ring 410 and extend outward from the inner ring 410. The first annulus 420 can interface with the inner ring 410 and form an L shaped cross-section. The first annulus 420 can include a first annulus outer end 422 located opposite from the inner ring 410. The first annulus 420 can include a first annulus forward face 423 and a first annulus aft face 424 opposite from the first annulus forward face 423. Length L2 can be the distance between the first annulus forward face 423 and the first annulus aft face 424 proximate the inner ring 410. In other words, the length L2 is the width of the first annulus 420. Length L2 can range from 1 mm to 50 mm.

The first annulus 420 can include a first annulus body portion 426 and a first annulus flange portion 425. The first annulus body portion 426 can extend outward from adjacent the inner ring 410 and can have a generally annular shape. The first annulus flange portion 425 can extend outward from the first annulus body portion 426 to the first annulus outer end 422. The first annulus flange portion 425 can taper narrower the further it extends from the first annulus body portion 426.

The first annulus body portion 426 can have a width equal to length L2. Height H2 of the first annulus body portion 426 can be the distance between the first annulus flange portion 425 and the inner ring 410. The height H2 can be scaled relative to the diameter of the shaft 200.

The first annulus flange portion 425 can have a width equal to length L3 at the outward end of the first annulus 420 opposite the inner ring 410. Height H3 of the first annulus flange portion 425 can be the distance outward from the first annulus body portion 426. The height H3 can range from 0.5 mm to 10 mm.

Height H4 can be the distance of the first annulus 420 from adjacent the inner ring 410 to the first annulus outer end 422. In an embodiment the height H4 can equal the sum of height H2 and height H3.

A first annulus filet 429 can extend between the inner ring 410 and the first annulus forward face 423. The first annulus filet 429 can extend circumferentially around the inner ring 410 in between impeller ribs 444 of the impeller 440.

The second annulus 430 can be spaced from the inner ring 410 and extend outward from the impellers 440. In an embodiment the second annulus 430 can be concentric to the inner ring 410. The second annulus 430 can be spaced from and proximate the first annulus forward face 423.

The second annulus 430 can include a second annulus inner end 431 and a second annulus outer end 432. The second annulus outer end 432 can be located opposite from the inner ring 410. The second annulus inner end 431 can be located opposite the second annulus outer end 432. In an embodiment the second annulus inner end 431 can be located proximate to the impeller 440.

The second annulus 430 can include a second annulus forward face 433 and a second annulus aft face 434 opposite from the second annulus forward face 433. In an embodiment the second annulus aft face 434 is located across from the first annulus forward face 423.

Length L4 can be the distance between the second annulus forward face 433 and the second annulus aft face 434 at the second annulus inner end 431. Length L5 can be the distance between the second annulus forward face 433 and the second annulus aft face 434 at the second annulus outer end 432. Length L5 can range from 1.25*L6 to 10*L6. Height H5 can be the distance between the second annulus inner end 431 and the second annulus outer end 432. The height H5 can range from (H4−H1)*0.2 to (H4−H1)*0.95. Height H6 can be the distance between the second annulus inner end 431 and the inner ring 410. The height H6 is not equal to zero.

The contamination guard 400 can include a collection area 452. The collection area 452 can be defined or formed by the space between the second annulus inner end 431, the inner ring 410, the impeller 440, and the first annulus forward face 423.

The second annulus aft face 434 and first annulus forward face 423 can form a passage 454 there between. The passage 454 can extend outwards from adjacent the second annulus inner end 431 to the second annulus outer end 432 and the first annulus outer end 422. The passage 454 can be in fluid communication with the collection area 452. The passage 454 can tapper narrower as it extends away from the inner ring 410.

The passage 454 can have a length L6 (sometimes referred to as width) that can be the distance between the second annulus aft face 434 and the first annulus forward face 423 at the second annulus inner end 431. The length L6 is not zero. The passage 454 can have a length L7 (sometimes referred to as width) that can be the distance between the second annulus outer end 432 and the first annulus outer end 422. The length L7 can range from 0.5 mm to L2. In an embodiment the ratio between the length L6 and the length L7 can be 2 to 1, 3 to 1, 4 to 1, or any increment there between. The passage 454 can be wider between the first annulus forward face 423 and the second annulus aft face 434 proximate to the second annulus inner end 431 than located proximate to the second annulus outer end 432.

The impellers 440 can each include an impeller body 442 and an impeller rib 444. The impeller body 442 can extend outward from adjacent the inner ring 410. In an embodiment the impeller body 442 extends from the inner ring 410 to the second annulus inner end 431. The impeller body 442 can extend beyond the second annulus forward face 433.

The impeller body 442 can include a first impeller body filet 449 opposite from the inner ring 410. In an embodiment the first impeller body filet 449 interfaces with the second annulus 430 proximate the second annulus inner end 431.

The impeller rib 444 can extend from adjacent the inner ring 410 to between the second annulus 430 and the first annulus forward face 423. The impeller rib 444 can extend between the second annulus aft face 434 to the first annulus forward face 423 away from the inner ring 410. The impeller rib 444 can be positioned between the impeller body 442 and the first annulus 420. In an embodiment the impeller rib 444 extend from the inner ring 410 to the second annulus outer end 432 and the first annulus outer end 422. The impeller rib 444 can further form or defined the passage 454.

Figure 3:
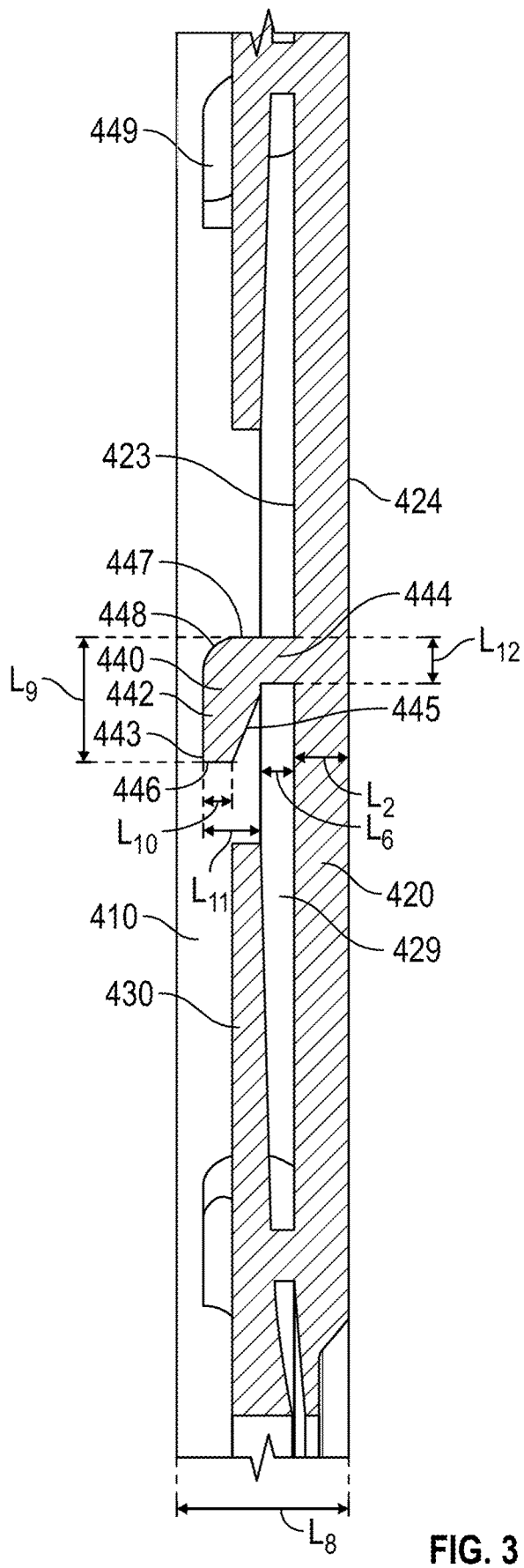
FIG. 3 is a cross-section of a different portion of the contamination guard from FIG. 1 along plane with the shaft, housing, and oil sealing assembly not shown.

FIG. 3 is a cross-section of a different portion of the contamination guard from FIG. 1 along plane with the shaft, housing, and oil sealing assembly not shown. Length L8 can be the width of the inner ring 410.

The impeller body 442 can include an impeller body forward face 443, an impeller body aft face 445, an impeller body first face 446, and an impeller body second face 447. The impeller body forward face 443 can be located opposite from the first annulus 420. In an embodiment the impeller body forward face 443 is generally parallel with the first annulus 420.

The impeller body first face 446 can extend from adjacent the impeller body forward face 443 toward the first annulus 420. In an embodiment the impeller body first face 446 is generally perpendicular to the first annulus 420.

The impeller body aft face 445 can extend from adjacent the impeller body first face 446 toward the impeller rib 444. In an embodiment the impeller body second face 447 extends diagonally from the impeller body first face 446 to the impeller rib 444 with respect to the first annulus 420.

The impeller body second face 447 can extend from adjacent the impeller rib 444 away from the first annulus 420. In an embodiment the impeller body second face 447 is generally parallel with the first annulus 420.

The impeller body 442 can include a second impeller body filet 448. The second impeller body filet 448 can extend from adjacent the impeller body second face 447 to adjacent the impeller body forward face 443

Length L9 can be the circumferential length of the impeller body 442 opposite the first annulus 420. The length L9 can be greater than 1 mm. Length L10 can be the distance between the impeller body forward face 443 and the impeller body aft face 445 adjacent the impeller body first face 446. Length L11 can be the distance between the impeller body forward face 443 and the impeller body aft face 445 adjacent the impeller rib 444. The length L11 can range from XX to YY.

The impeller rib 444 can extend from the impeller body 442 to the first annulus 420. Length L12 can be the circumferential length of the impeller rib 444 from adjacent the impeller body aft face 445 to the impeller body second face 447.

Figure 4:
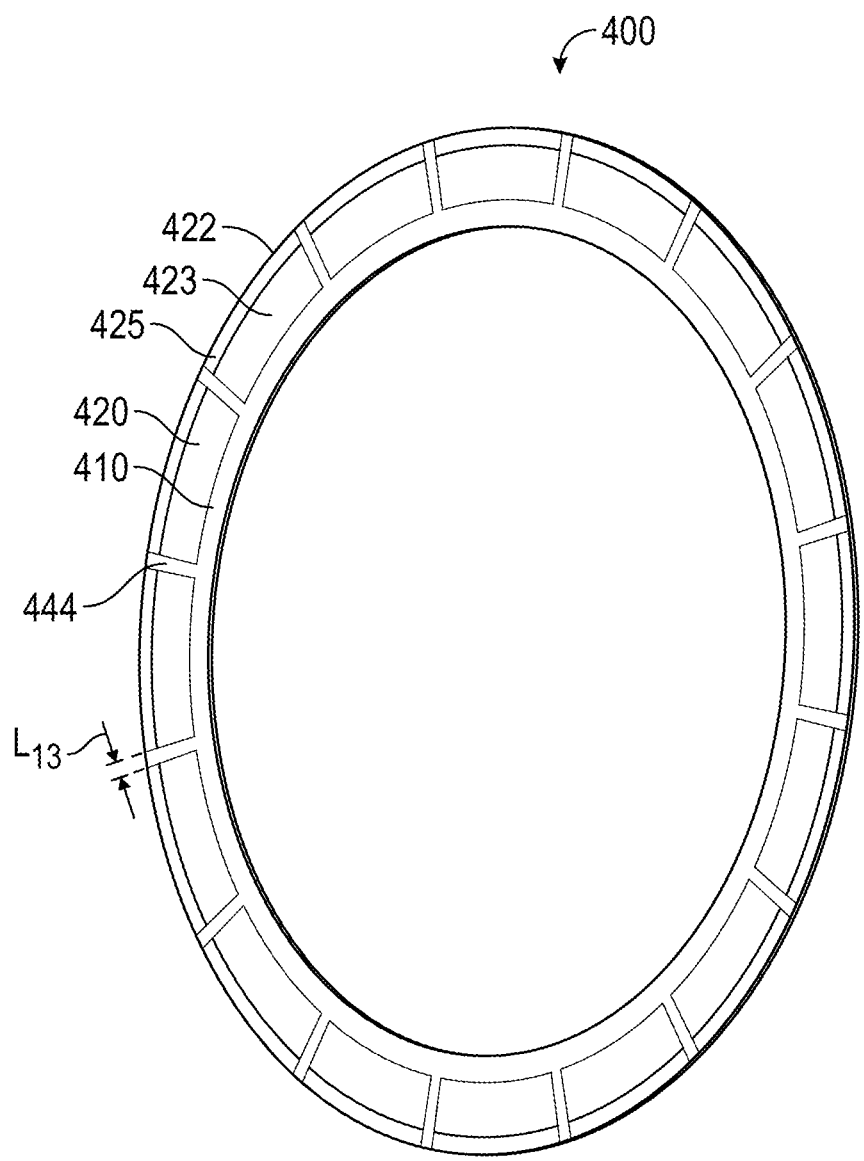
FIG. 4 is a perspective view of a portion of the contamination guard from FIG. 1 with the second annulus and impeller body removed and the shaft, housing, and oil sealing assembly not shown.

FIG. 4 is a perspective view of a portion of the contamination guard from FIG. 1 with the second annulus and impeller bodies removed and the shaft, housing, and oil sealing assembly not shown. Each impeller rib 444 can extend away from the inner ring 410 along the first annulus forward face 423 to the first annulus outer end 422. Length L13 can be the circumferential width of the impeller rib 444. The length L13 can be substantially similar located adjacent to the inner ring 410 and located adjacent to the first annulus outer end 422. In an embodiment the length L13 is constant from the inner ring 410 to the first annulus outer end 422. In other examples the impeller rib 444 can taper or have a varying circumferential width as it extends outward from the inner ring 410. In other words the length L13 of the impeller rib 444 has varying values between the inner ring 410 and the first annulus outer end 422.

INDUSTRIAL APPLICABILITY

The present disclosure generally applies to a contamination guard 400 for machinery, equipment, and transmissions or other mechanisms having an interface between rotating and non-rotating components. The disclosed contamination guard 400 can help to limit harmful debris and contaminants from entering internal components of machinery, equipment, and transmissions, such as the oil sealing assembly 300. The described embodiments are not limited to use in conjunction with a particular type of machinery, equipment, or transmission as contamination guards 400, and thus their components, may be suited for any number of industrial applications.

Generally, embodiments of the presently disclosed contamination guard is applicable to the use, assembly, manufacture, operation, maintenance, repair, and improvement of rotating shaft assemblies 100, and may be used in order to improve performance and efficiency, decrease maintenance and repair, and/or lower costs. In addition, the contamination guard may be used in a first product, as a retrofit or enhancement to existing rotating shaft assemblies, as a preventative measure, or even in response to an event.

Rotating systems generally need to seal a liquid medium and need to be protected from air borne contamination. Oil sealing assemblies are generally used in transmissions, engines, pumps, and other applications. Different types of contacting or passive non-contacting excluders are added to the rotating shaft assembly to improve the performance of the oil sealing assembly in dirty environments. However, in certain applications contacting excluders restrict the airflow to the oil sealing assembly beyond its capability to operate, and passive non-contacting excluders do not provide an adequate level of protection for the oil sealing assembly. These limitations of the oil sealing assembly reduce the performance of the oil sealing assembly and can cause damage to the surrounding components.

The contamination guard 400 can be configured to push contaminated air away from the oil sealing assembly 300. The first annulus 420 can be in contact with the oil sealing assembly 300 and reduce the exposed area of the oil sealing assembly 300. The passage 454 can be configured to sling away heavier dust particles suspended in the surrounding air. The contamination guard 400 has a collection area 452 for receiving the surrounding air having heavier dust particles and a passage 454 for exiting the air with dust particles while allowing clean air to travel to the oil sealing assembly 300. During operation and rotation of the shaft 200, the impellers 440 and collection area 452 intake dirty air. In an embodiment the impellers 440 are configured to intake air by rotating clockwise. In other examples the impellers can be configured to intake air by rotating counterclockwise. The passage 454 can direct the dirty air to create a wall of high pressure air to push contamination away from the oil sealing assembly 300. The suspended heavier dust and debris particles are slinged away, allowing clean air to travel to the oil sealing assembly 300. The contamination guard 400 can increase the performance of the oil sealing assembly 300 by providing adequate clean air flow to the oil sealing assembly 300 and guarding the oil sealing assembly 300 from contamination. The first annulus flange portion 425 can be shaped narrower than the first annulus body portion 426 to provide passage of clean air to the oil sealing assembly 300.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art.

What is claimed is:

1. A contamination guard for a rotatable shaft of a machine, the contamination guard comprising:
   an inner ring;
   a first annulus extending outward from the inner ring, the first annulus having
      a first annulus forward face, and
      a first annulus aft face opposite the first annulus forward face;
   a second annulus spaced from and proximate to the first annulus forward face and spaced outward from the inner ring, the first annulus and the second annulus forming a passage there between, the second annulus having
      a second annulus outer end located opposite from the inner ring,
      a second annulus inner end located opposite from the second annulus outer end and spaced from the inner ring,
      a second annulus forward face, and
      a second annulus aft face opposite the first annulus forward face,
      wherein the passage between the first annulus forward face and the second annulus aft face is axially wider proximate to the second annulus inner end than proximate to the second annulus outer end; and
   a plurality of impellers, spaced apart from each other, each having
      an impeller body extending outward from adjacent the inner ring to the second annulus and beyond the second annulus forward face, and
      an impeller rib extending from adjacent the inner ring to between the second annulus aft face and the first annulus forward face away from the inner ring.

2. The contamination guard of claim 1, wherein for each of the plurality of impellers, the impeller rib extends from the inner ring to adjacent the second annulus outer end.

3. The contamination guard of claim 1, wherein for each of the plurality of impellers, the impeller body extends from adjacent the inner ring to the second annulus forward face and the second annulus inner end.

4. The contamination guard of claim 1, wherein the first annulus further comprises a first annulus flange portion located opposite from the inner ring.

5. The contamination guard of claim 3, wherein the impeller body is circumferentially wider than the impeller rib.

6. The contamination guard of claim 1, wherein the second annulus is axially wider proximate to the second annulus outer end than the second annulus inner end.

7. The contamination guard of claim 1, wherein the first annulus interfaces with the inner ring and forms an L shaped cross-section.

8. A contamination guard for a machine, the contamination guard comprising:
   an inner ring;
   a first annulus extending circumferentially around the inner ring and away from the inner ring;
   a second annulus extending circumferentially around the inner ring, the second annulus spaced from and outward from the inner ring, the second annulus spaced from and proximate to the first annulus, the second annulus having
      a second annulus outer end located opposite from the inner ring, and
      a second annulus inner end located opposite from the second annulus outer end and spaced from the inner ring; and
   an impeller extending away from the inner ring to the second annulus, the impeller, the first annulus, and the second annulus defining a passage there between,
      wherein the passage is axially wider proximate to the second annulus inner end than proximate to the second annulus outer end.

9. The contamination guard of claim 8, wherein the impeller extends from the inner ring to adjacent the second annulus outer end.

10. The contamination guard of claim 8, wherein the second annulus is axially wider proximate to the second annulus outer end than the second annulus inner end.

11. The contamination guard of claim 8, wherein the contamination guard is made from a single parent material.

12. A contamination guard for a machine having a shaft, the contamination guard comprising:
   an inner ring of a size to encircle the shaft of the machine;
   a first annulus extending outward from the inner ring;
   an impeller extending outward from adjacent the inner ring, the impeller having
      an impeller body extending outward from adjacent the inner ring, and
      an impeller rib extending outwards from adjacent the inner ring, the impeller rib positioned between the impeller body and the first annulus;
   a second annulus extending outward from the impeller body and along the impeller rib, the second annulus having
      a second annulus outer end located opposite from the inner ring and
      a second annulus inner end located opposite from the second annulus outer end and spaced from the inner ring; and
   a passage extending outward from the inner ring, the passage located between the second annulus the impeller rib, and the first annulus, wherein the passage is axially wider proximate to the second annulus inner end than proximate to the second annulus outer end.

13. The contamination guard of claim 12, wherein the impeller rib extends from the inner ring to adjacent the second annulus outer end.

14. The contamination guard of claim 12, wherein the second annulus is wider proximate to the second annulus outer end than the second annulus inner end.

15. The contamination guard of claim 12, wherein the impeller includes a plurality of impeller ribs.

16. The contamination guard of claim 12, wherein the impeller body is circumferentially wider than the impeller rib.

17. The contamination guard of claim 12, wherein the first annulus interfaces with the inner ring and forms an L shaped cross-section.

* * * * *